(12) United States Patent
Pontarolo et al.

(10) Patent No.: US 11,613,061 B2
(45) Date of Patent: Mar. 28, 2023

(54) GUIDING AND CALIBRATION DEVICE FOR BLOWN PLASTIC FILM WITH SLIDING BARS

(71) Applicants: Luca Pontarolo, Busto Arsizio (IT); Marco Piero Pontarolo, Gallarate (IT)

(72) Inventors: Luca Pontarolo, Busto Arsizio (IT); Marco Piero Pontarolo, Gallarate (IT)

(*) Notice: Subject to any disclaimer, the term of this patent is extended or adjusted under 35 U.S.C. 154(b) by 332 days.

(21) Appl. No.: 17/042,360

(22) PCT Filed: Apr. 2, 2019

(86) PCT No.: PCT/EP2019/058279
§ 371 (c)(1),
(2) Date: Sep. 28, 2020

(87) PCT Pub. No.: WO2019/192999
PCT Pub. Date: Oct. 10, 2019

(65) Prior Publication Data
US 2021/0023760 A1    Jan. 28, 2021

(30) Foreign Application Priority Data
Apr. 5, 2019   (IT) .................. 102018000004249

(51) Int. Cl.
*B29C 48/90*   (2019.01)
*B29L 23/00*   (2006.01)

(52) U.S. Cl.
CPC .......... *B29C 48/903* (2019.02); *B29C 48/907* (2019.02); *B29L 2023/001* (2013.01)

(58) Field of Classification Search
CPC ... B29C 48/0018; B29C 48/10; B29C 48/265; B29C 48/266; B29C 48/355; B29C 48/903; B29C 48/907
See application file for complete search history.

(56) References Cited

U.S. PATENT DOCUMENTS 3,980,418 A    9/1976   Schott, Jr.
2009/0304840 A1   12/2009   Frische et al.

FOREIGN PATENT DOCUMENTS

| CN | 104985801 | 10/2015 |
|----|-----------|---------|
| CN | 204820320 | 12/2015 |
| CN | 107089002 | 8/2017  |
| DE | 3117806   | 11/1982 |

(Continued)

OTHER PUBLICATIONS

International Search Report, PCT/EP2019/058279, dated Jun. 14, 2019.

*Primary Examiner* — Xiao S Zhao
*Assistant Examiner* — Joseph S Leyson
(74) *Attorney, Agent, or Firm* — Jacobson Holman PLLC (57) ABSTRACT

A guiding and calibration device (100) of a blown plastic film is described, comprising a bearing structure (1, 2) which includes equidistant rotation fulcrums (3) of rotating structures (4) along an ideal circumference. Each rotating structure (4) comprises a rotating vertical upright (43) and at least one arm (44, 45) fixed to said rotating vertical upright (43). A vertical floating element (5) is rotatably fixed to the at least one arm (44, 45). The device (100) further comprises groups of rectilinear bars (12a, 12b) consisting of at least one pair of rectilinear bars (12a, 12b) parallel to each other and placed slidingly side by side along respective external edges.

10 Claims, 6 Drawing Sheets

(56) References Cited

FOREIGN PATENT DOCUMENTS

| | | |
|---|---|---|
| EP | 1967350 | 9/2008 |
| IT | 1421006 | 4/2016 |
| WO | 2016/139573 | 9/2016 |
| WO | 2016/193400 | 12/2016 |
| WO | WO-2019192998 A1 * 10/2019 ......... B29C 48/0018 |

* cited by examiner

GUIDING AND CALIBRATION DEVICE FOR BLOWN PLASTIC FILM WITH SLIDING BARS

BACKGROUND OF THE INVENTION

The present invention relates to a guiding and calibration device for blown plastic film with sliding bars.

In systems for extruding blown plastic film, a mass of molten plastic resin is continuously extracted from an annular die arranged at the top of an extrusion head by means of a calender, in turn arranged on the top of said system and centered with respect to the vertical axis formed by the alignment of the center of the extrusion head with the average point of the calender rollers.

Such a tubular mass is blown from the inside to characterize it in the shape of a thin tubular film, in jargon referred to as a "blown film", having defined dimensions and thicknesses.

Such an internal blowing is combined with a further cooling flow outside the tubular film in order to solidify the material thereof and fix the physical and dimensional features thereof. Such a solidifying area is commonly identified as a frost line.

In this first section of the system, the tubular film being formed is very delicate and subjected to significant air turbulences, thus requiring a device capable of accompanying the travel, containing oscillations and slips, in addition to helping define the final dimensional features thereof in conjunction with system monitoring sensors.

It is known how these devices, in jargon referred to as blown film guide calibrator drums, consist of one or more mutually articulated structures which simultaneously bring a plurality of guide means close to the circumference of the tubular film in a tangential manner Such guide means, usually consisting of a plurality of rollers or friction pads or air-blades, need to be adjustable to different diameters according to the dimensions of the desired tubular film, and simultaneously need to provide a solid and reliable anchoring point for the plurality of sensors which constantly monitor the dimensional parameters of the extruded product in order to timely intercept any deviations thereof from the set values, and thus provide the arrangements monitoring system with the checks required for convenient corrections. In order to provide the correct measurements, such sensors need to be arranged so as to read the tubular film always in radial direction, i.e. always pointing towards the center of the circumference described by the film. According to the most widespread signal processing logics, the reading distance between sensor and film needs to remain always constant along the whole diameter adjustment range of the calibrator.

It is therefore easy to understand how the positioning and orientation accuracy of the guide means together with the rigidity of the whole calibration device are important factors for the final quality of the extruded product made.

There are multiple types of such calibration devices, the main characterizations of which lie in the various system architectures created for the adjustment along the horizontal (radial) axis of the guide means assembly.

By way of example, the device described in DE-3117806C2 is mentioned as prior art, in which the kinematic mechanism for adjusting the diameter is of the "scissor" type, consisting of a plurality of pantograph joints, each moving roller assemblies in radial direction towards the center of the tubular film through a system of worm screws and sliding elements. Such a construction type has been considered the most desirable for a long time due to a theoretical "zero error" of tangential positioning of the median point of the guide elements over the circumferential surface of the blown film, despite a certain difficulty in containing the mechanical clearances inherently present in the specific type of mechanics. Other critical points of this type of architecture are the significant overall dimensions and high construction costs.

Another type of device is disclosed, for example, in IT-1421006, in which the guide elements are brought directly on the tangent of the tubular circumference by means of a simple pivoting movement of a plurality of arms connected to one another and pivoted on the bearing structure of the device. Such a type, referred to as a "pivot", has gradually established itself in the field due to the simplicity, reliability and efficacy of the system, which can be found in the sounder implementations, thus making the intrinsic and natural deviation between median point of the guide element and actual tangent point on the tubular circumference characterizing this type of negligible.

A variant of the pivoting architecture described above is known from U.S. Pat. No. 3,980,418 and EP1967350, in which the guide elements are separate from the respective bearing structures by interposing a lever system capable of correcting, to the greatest extent possible, the orientation of the guide means in order to decrease the deviation between the ideal middle tangent point and the actual tangent point thereof resulting from the pivot movement described above. Such systems approximate a radial orientation of the guide means, but still have a deviation error of +/−1° in the best implementations.

Increasing productivity needs combined with the increasing quality standards required of the extruded tubular film led over more recent years to the development of a new machine architecture which sets the goal of combining the merits of the "scissor" type construction with those of the "pivot" type.

Known examples of such a type are found in US-2009304840 and WO-2016139573A1, where the guide elements are pivoted on the front end part of the respective "pivot" bearing structures and are each connected to the respective adjacent guide elements by means of components capable of keeping the orientation of such guide elements in a position which is always orthogonal with respect to the radius of the tubular film, whatever the variation in diameter induced by the main movement of the pivoting structures.

Both types mentioned above significantly overcome the characteristic limitations of the devices described above, but still have certain critical points.

The guide elements in US-2009304840 are connected to one another by means of a plurality of horizontal rods constrained in forced sliding guides with dual-track, offset according to both the horizontal and vertical axis. In addition to being expensive, such a kinematic mechanism may experience malfunctions induced by the inconstant maintenance activity of the guides and alignments. Therefore, the adjustment movement of the calibrator, with which the free sliding of the rods in the respective guides coincides, could lose fluidity and accuracy up to reaching the complete blocking if foreign or residual processing bodies were to obstruct the guides.

Instead, in the first embodiment of WO-2016139573A1, the guide elements are connected to one another by means of a plurality of joints, each of which has various couplings between the component parts thereof. Also in this case, problems of non-optimal fluidity with which such joints operate while fed by the main movement may occur. Being close to the extruded tubular film, such joints are indeed hit by the flow of cooling air which carries volatile pollutants and resin residuals of the extrusion process which may dirty the joints thereof up to compromising the free movement thereof, and therefore the capacity of fluid adjustment of the whole device, if a constant and timely maintenance activity is not performed.

Moreover, such joints need to be made with particular skill in order to keep the correct frictions to reduce the inherently present clearances, which otherwise may result in vibrations and inadequate overall rigidity of the system during the operation in the plant. This also results in an inevitable high production cost.

The second embodiment described in WO-2016139573A1 replaces such joints in favor of telescopic rods arranged diagonally, which according to the number of stages implemented for their construction, either greatly limit the radial excursion capacity of the calibrator or result in a very prohibitive production cost.

SUMMARY OF THE INVENTION

It is the object of the present invention to provide a guiding and calibration device of the "pivot" movement type which overcomes the above problems disclosed.

It is a further object of the present invention for the device to allow an orientation induced by the guide elements to be obtained such as the tangent of the median point thereof always remains orthogonal with respect to the radius of the tubular film.

According to the invention, said and further objects are achieved by a device as defined in the claims.

The guide means are advantageously kept tangent to the same circumference due to the related sliding of the bars, which always remain parallel and free to slide over one another.

The device according to the present invention achieves a more affordable type of construction as compared to the known types, with less components, less kinematic mechanisms and less need for maintenance.

DESCRIPTION OF THE DRAWINGS

These and other features of the present invention will become more apparent from the following detailed description of a practical embodiment thereof, shown by way of non-limiting example in the accompanying drawings, in which.

DETAILED DESCRIPTION OF THE INVENTION

Figure 1:
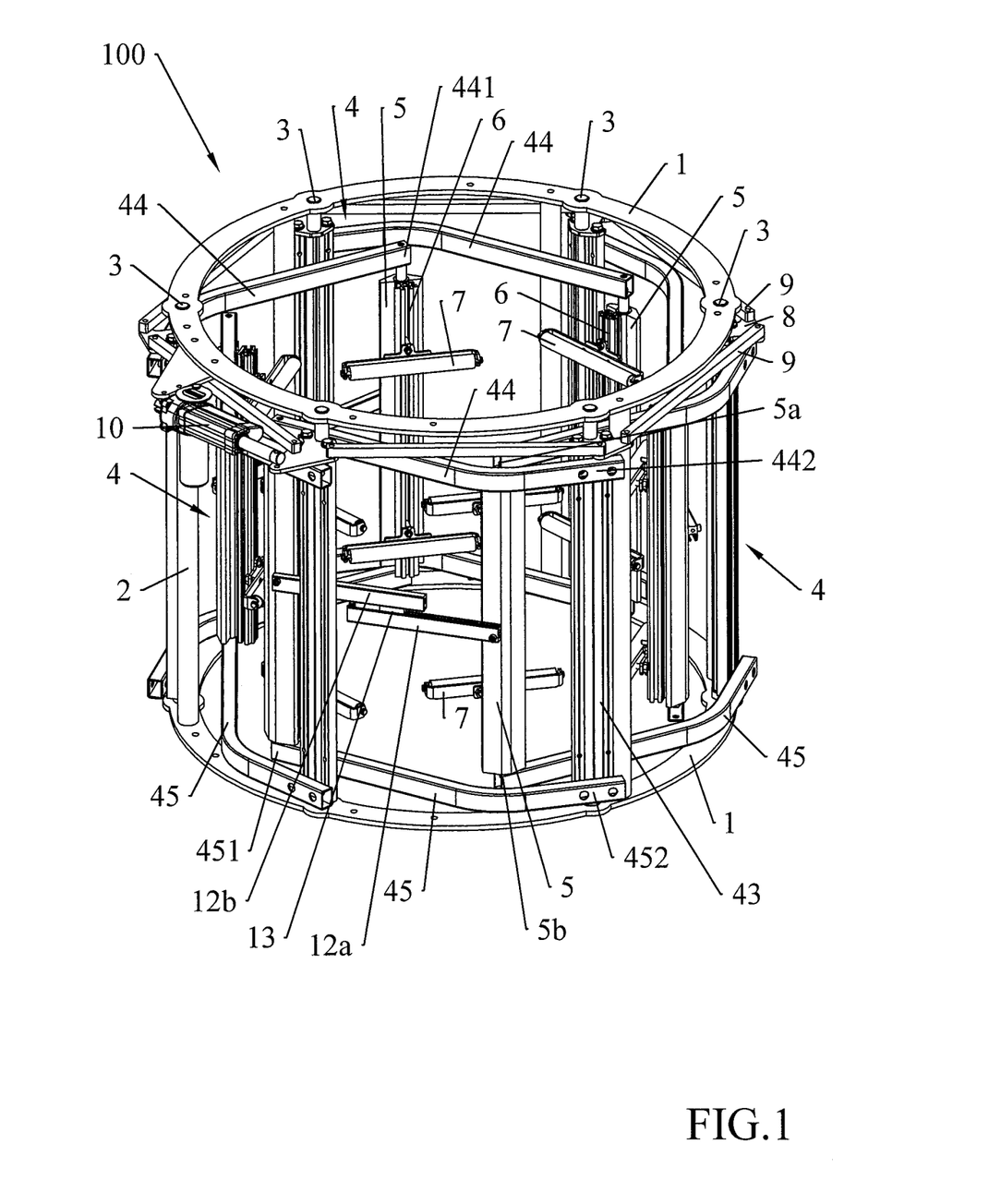
FIG. 1 shows a perspective view of a device according to the present invention, with sliding bars according to a first embodiment.

FIG. 1 shows a guiding and calibration device 100 of blown plastic film (also referred to as a calibrator drum) in which a bearing structure comprises a pair of rings 1 spaced apart by columns 2. There may be polygonal structures in place of the rings 1.

Such rings 1 accommodate equidistant rotation fulcrums 3 of rotating structures 4 along an ideal circumference.

Each rotating structure 4 comprises a rotating vertical upright 43, an upper arm 44 and a lower arm 45.

The upper arm 44 is fixed to the upper end of upright 43, and the lower arm 45 is fixed to the lower end of upright 43.

Six rotating structures 4 are depicted in the present embodiment.

A vertical floating element 5 is rotatably fixed to a first end 441, 451 of each pair of arms 44, 45.

A second end 442, 452 of the arms 44, 45 is integral with upright 43.

At least one vertical profile 6 capable of supporting guide means 7 of the extruded tubular film is fixed to the floating element 5. Alternatively, the guide means 7 may be directly fixed to the floating element 5.

The guide means 7 in the present embodiment are two horizontal rollers conveniently fixed to the vertical profile 6. Alternatively, the guide means 7 may be friction pads, air-blades or others.

Possible elements required for the proper treatment of the extruded film, for example, reading sensors, air blowing mouths, pollutant suction hoods, and others, may also be fixed to the vertical profile 6 or to the floating element 5.

The rotating structures 4 are connected to one another through a pantograph system comprising levers 8 and rods 9 which synchronize the movement thereof, actuated by one or more motors 10.

The floating elements 5 rotate with respect to a vertical axis passing through an upper pin 5a and a lower pin 5b.

Device 100 further comprises pairs of rectilinear bars parallel to each other and placed slidingly side by side.

Each pair of bars comprises a first bar 12a parallel to and placed slidingly by side of a second bar 12b.

The bars 12a, 12b slide with respect to each other along respective external edges.

The bars 12a, 12b have respective parallel and distinct longitudinal axes of symmetry along which they slide with respect to each other.

The bars 12a, 12b are integrally fixed to adjacent floating elements 5 along the rings 1.

The bars 12a, 12b are mutually slidingly constrained by at least one slider 13 which maintains the parallelism of the bars 12a, 12b during the entire adjustment movement of the opening/closing of device 100.

The figures depict an embodiment with bars 12a, 12b longitudinally grooved and slidingly constrained by means of two sliders 13.

The bars 12a, 12b are horizontal, and bar 12b slides over bar 12a.

Figure 2:
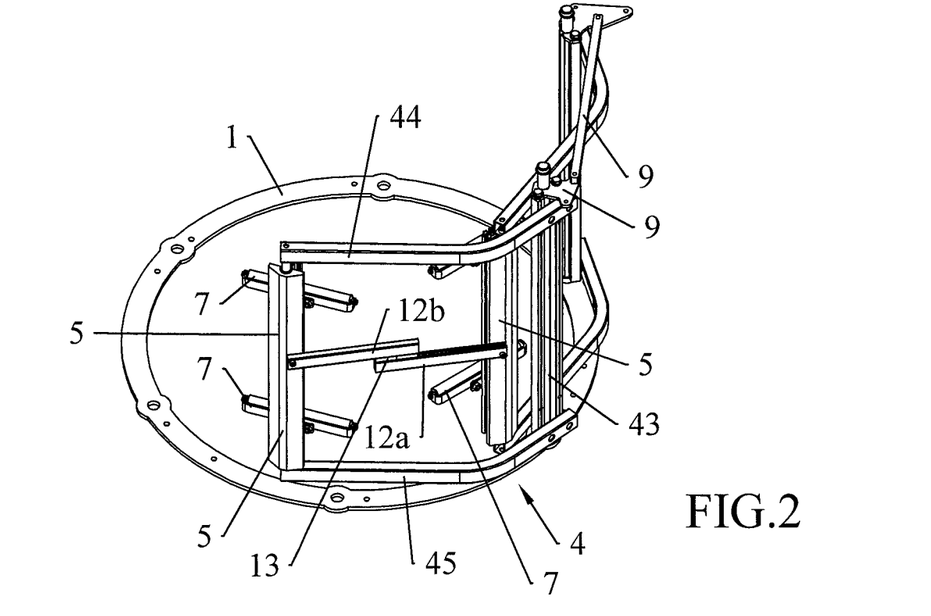
FIG. 2 shows a perspective view of a portion of the device, with sliding bars in a first position.
Figure 3:
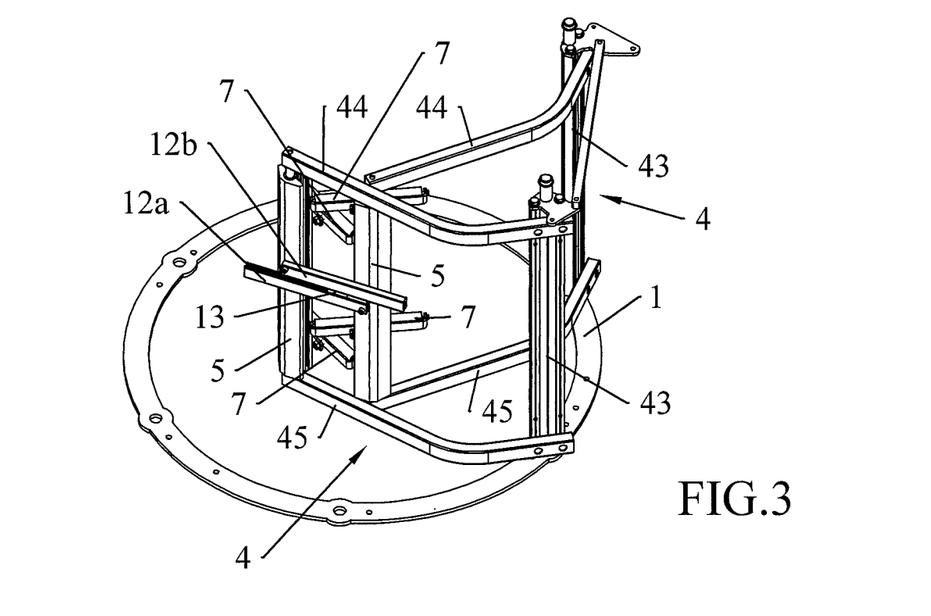
FIG. 3 shows a perspective view of a portion of the device, with the sliding bars in a second position.

Each bar 12a, 12b has a length which is at least slightly greater than half the existing distance between two adjacent floating elements 5 when arranged at the maximum opening (FIG. 2).

Alternatively, at least one bar 12a, 12b of the pair of bars 12a, 12b is longer than the other bar 12b, 12a of the same pair of bars 12a, 12b.

In any case, each bar 12a, 12b is capable of sliding by the side of the other so that at least one bar 12a, 12b goes beyond the end of the other bar 12b, 12a fixed to the floating element 5, thus allowing the mechanical limits dictated by telescopic solutions to be overcome and thus allowing a broad range to be covered while limiting the overall volume of device 100.

Three alternating pairs of floating elements 5 may be connected in the present embodiment, i.e. being equal in number to the number of the floating elements 5 divided by two, using less components and resulting in increased economic advantage.

The number of pairs of bars 12a, 12b generally needs to be at least half the number of vertical floating elements 5.

Figure 4:
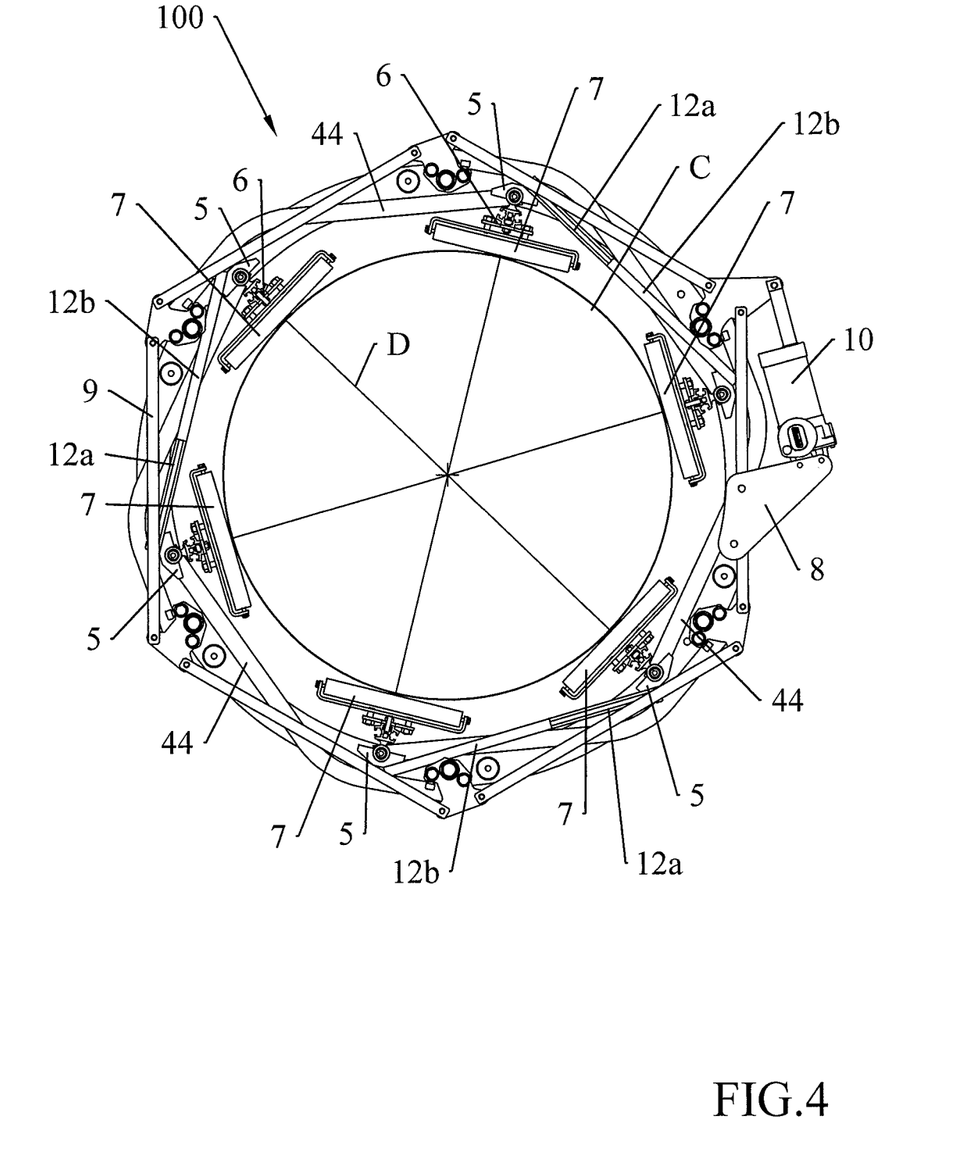
FIG. 4 shows a top plan view of the device in maximum opening position of the device.
Figure 5:
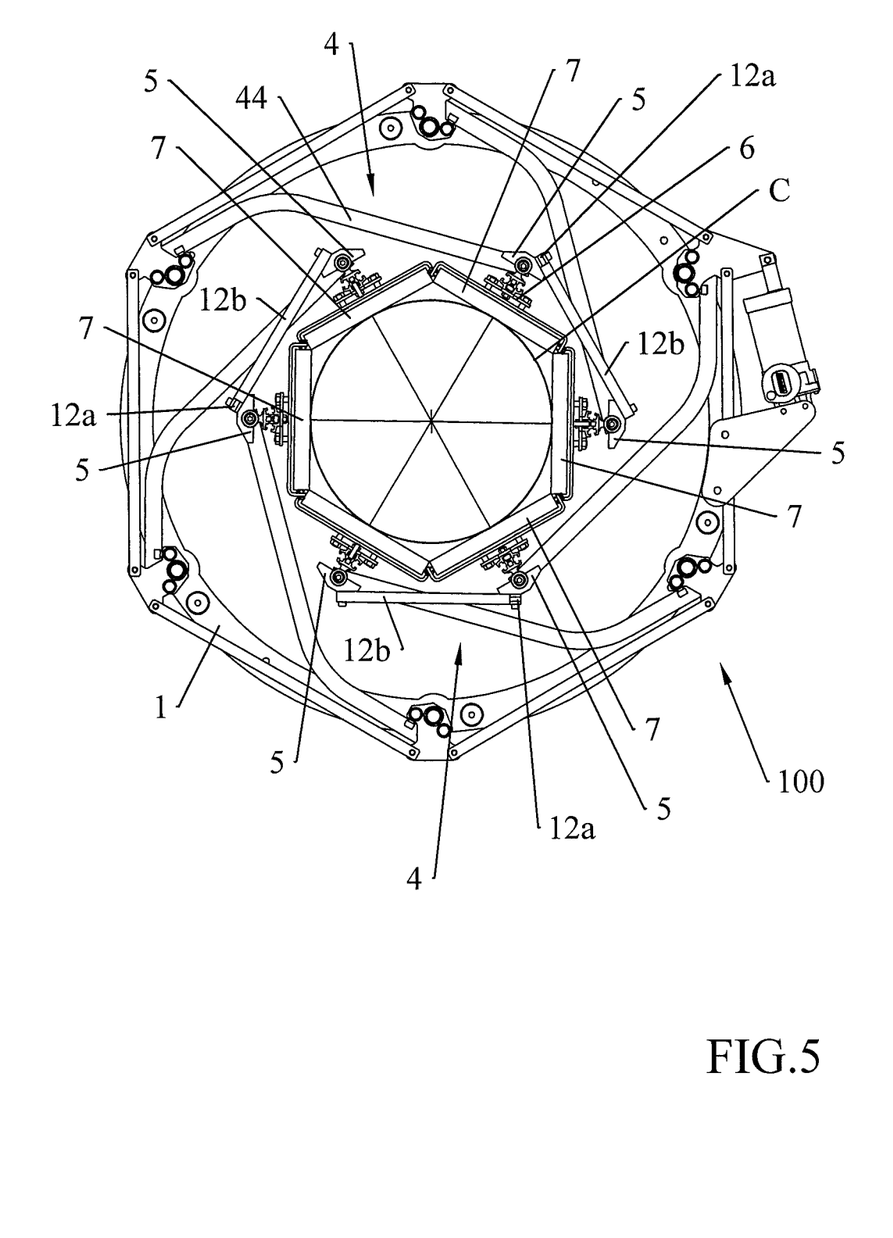
FIG. 5 shows a top plan view of the device in intermediate opening position of the device.
Figure 6:
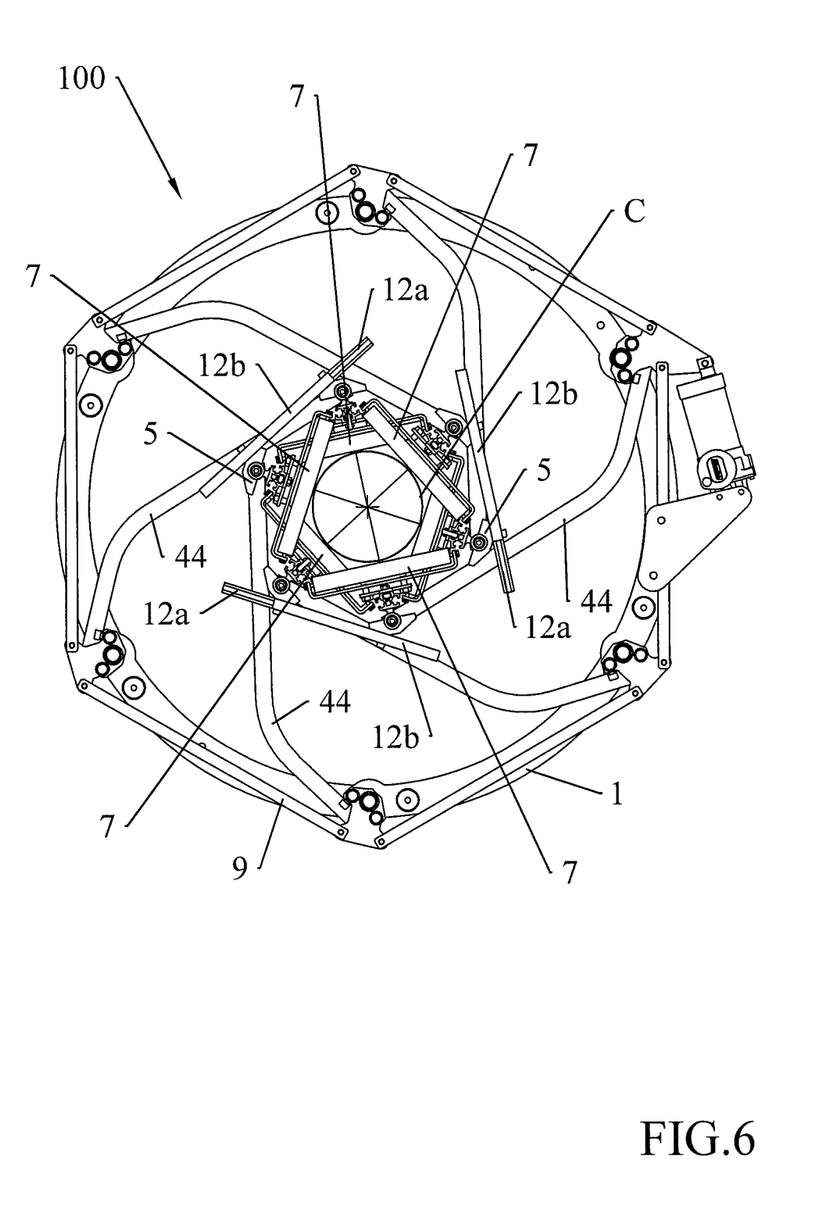
FIG. 6 shows a top plan view of the device in minimum opening position of the device.

FIGS. 4 to 6 depict device 100 in three exemplary positions of maximum, intermediate and minimum opening.

Figure 7:
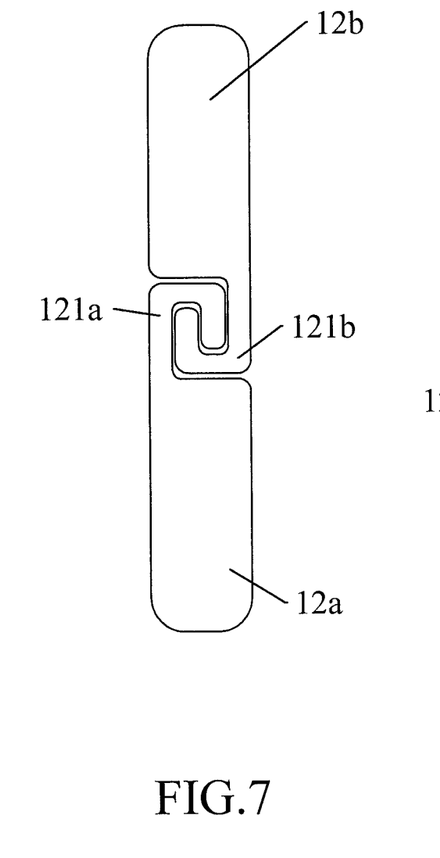
FIG. 7 shows a front view of sliding bars according to a second embodiment.

FIG. 7 shows a pair of bars 12a, 12b according to a second embodiment, with respective hooked external edges 121a, 121b associated with one another so as to allow the sliding of a bar 12a with respect to the other bar 12b. In this embodiment no cursor 13 is required.

Advantageously the two bars 12a, 12b can be obtained by cutting a single bar: the two bars 12a, 12b are in fact the same but mounted with the opposite position so that the hooked external edges 121a, 121b can be slidably associated.

Figure 8:
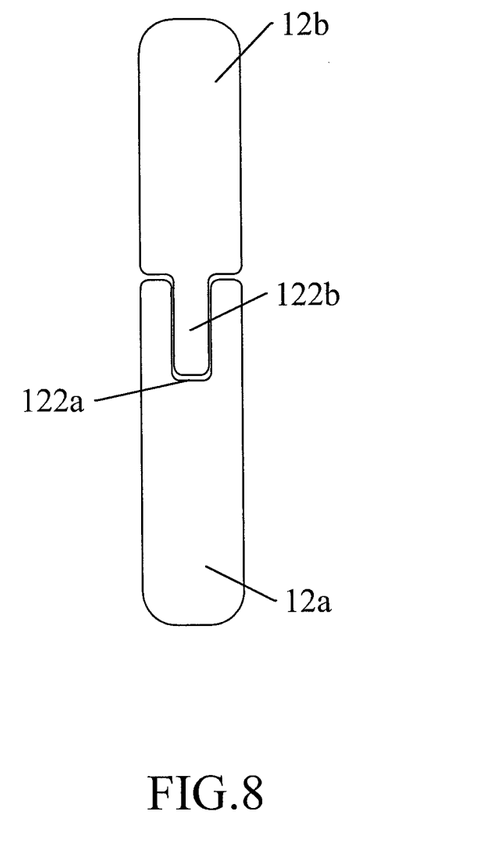
FIG. 8 shows a front view of sliding bars according to a third embodiment.

FIG. 8 shows a pair of bars 12a, 12b according to a third embodiment, in which a bar 12a has an external edge with a loop 122a in which slides a protrusion 122b of an external edge of the other bar 12b. Also in this embodiment no cursor 13 is required.

In operation, starting from the maximum opening position in FIG. 4, the activation of motor 10 allows the simultaneous clockwise rotation of the rotating structures 4.

The arms 44, 45 rotate and with them the floating elements 5, which in turn rotate about the vertical axis passing through the pins 5a, 5b.

The rollers 7 advantageously are kept horizontal and tangent to a same circumference C (FIG. 5) due to the relative sliding of the bars 12a, 12b which always remain parallel and free to slide over one another by means of the sliders 13.

Continuing with the rotation, the minimum opening position (FIG. 6) is reached, in which circumference C has minimum radius. It is worth noting that the rollers 7 overlap one another in the position because they are fixed at various heights on the vertical profile 6.

Alternatively, the bars 12a, 12b may not be horizontal, but always need to be kept parallel and freely sliding side by side along respective external edges.

Device 100 according to the present invention achieves a more affordable type of construction as compared to the known types, with less components, less kinematic mechanisms and less need for maintenance.

The correct installation of the bars 12a, 12b on the respective floating element 5 is facilitated by making the latter by means of an extruded section bar having inclined planes which are symmetrical to a directrix D passing through the center of circumference C.

Groups of more than two bars 12a, 12b may alternatively be provided, fixed to two adjacent floating elements 5 placed slidingly side by side.

For example, there may be a bar 12a fixed to a floating element 5, and two bars 12b fixed to the adjacent floating element 5. Bar 12a slides between the two bars 12b, thus achieving an equivalent technical advantage.

Additionally, there may be another two bars 12a which slide by the side of the two bars 12b.

A single arm or more than two arms may be provided in place of a pair of arms 44, 45 for each vertical upright 43.

The invention claimed is:

1. A guiding and calibration device for a blown plastic film, comprising a bearing structure which provides along circumference equidistant rotation fulcrums of rotating structures,
   each rotating structure comprises a rotating vertical upright and at least one arm fixed to the rotating vertical upright,
   a vertical floating element is rotatably fixed to the at least one arm,
   guide means for the blown plastic film are fixed to the vertical floating element,
   the rotating structures are connected to each other through motion synchronization devices operated by at least one motor,
   wherein the guiding and calibration device further comprises groups of rectilinear bars formed by at least one pair of rectilinear bars parallel to each other and which slide side by side along respective external edges of each pair of rectilinear bars,
   each pair of rectilinear bars being integrally fixed to respective adjacent vertical floating elements.

2. The guiding and calibration device according to claim 1, wherein the rectilinear bars of each pair of rectilinear bars are mutually slidingly constrained by at least one slider able to maintain the parallelism of the rectilinear bars during adjustment movement of opening and closing of the guiding and calibration device, between a maximum opening position and a minimum opening position.

3. The guiding and calibration device according to claim 2, wherein the rectilinear bars are longitudinally grooved.

4. The guiding and calibration device according to claim 1, wherein the rectilinear bars of each pair of rectilinear bars have respective hooked external edges associated with one another so as to allow the sliding of a rectilinear bar of each pair of rectilinear bars with respect to the other rectilinear bar of each pair of rectilinear bars.

5. The guiding and calibration device according to claim 1, wherein a rectilinear bar of each pair of rectilinear bars has an external edge with a loop in which slides a protrusion of an external edge of the other rectilinear bar of each pair of rectilinear bars.

6. The guiding and calibration device according to claim 1, wherein at least one rectilinear bar of each pair of rectilinear bars has a length greater than half the distance existing between two adjacent vertical floating elements when the guiding and calibration device is in a maximum opening position.

7. The guiding and calibration device according to claim 1, wherein the rectilinear bars are horizontal.

8. The guiding and calibration device according to claim 7, wherein a rectilinear bar of the pair of rectilinear bars slides over the other rectilinear bar of the same pair of rectilinear bars.

9. The guiding and calibration device according to claim 1, wherein there is provided a number of pairs of the rectilinear bars equal to at least half the number of the vertical floating elements.

10. The guiding and calibration device according to claim 1, wherein the at least one arm is provided with a first end to which the vertical floating element is rotatably fixed, and a second end integrally fixed to the rotating vertical upright.

* * * * *